United States Patent Office 3,293,318
Patented Dec. 20, 1966

3,293,318
DEHYDROGENATION PROCESS
Kestutis A. Keblys, Southfield, Mich., assignor to Ethyl Corporation, New York, N.Y., a corporation of Virginia
No Drawing. Filed Jan. 3, 1966, Ser. No. 517,940
9 Claims. (Cl. 260—683.3)

The present invention relates to the dehydrogenation of saturated hydrocarbons. More particularly, the invention relates to process for the catalytic dehydrogenation of higher molecular weight paraffins to the corresponding olefins.

The dehydrogenation of hydrocarbons per se is well known and many processes and catalyst were employed in the prior art to accomplish the dehydrogenation. Most of the known processes and catalysts, however, are concerned with dehydrogenation of paraffins having less than six carbon atoms, dehydrogenation of olefins to polyunsaturated olefins, or the dehydrogenation of paraffins having 6 or more carbon atoms to yield aromatic products. Very little is available in the prior art dealing with the dehydrogenation of paraffins having more than six carbon atoms to obtain corresponding olefins. Most of the known catalysts, such as, for example, the well-known chromia-alumina dehydrogenation catalysts are not very effective for dehydrogenating higher paraffins to olefins because, in addition to causing some dehydrogenation, they also cause considerable aromatization and cracking. Separation of such undesirable products from olefins is very tedious and expensive. Furthermore, few relatively efficient methods of separation are available and these are generally outside the scope of commercial use. It is, therefore, readily apparent that a new process for the dehydrogenation of paraffins to olefins must be developed which will accomplish the dehydrogenation without also causing aromatization or cracking.

It is, therefore, an object of this invention to provide a new process for the dehydrogenation of paraffin hydrocarbons having six or more carbon atoms. A more particular object is to provide a process for the catalytic dehydrogenation of n-paraffins having from 10 to 18 carbon atoms whereby relatively good yields of monoolefin hydrocarbons are obtained with minimum aromatization and cracking. Additional objects will become apparent from the following detailed description.

The above objects are accomplished by providing a process for the dehydrogenation of n-paraffins having 6 to 24 carbon atoms to the corresponding olefins, said process comprising contacting a feed containing at least one of said n-paraffins with a catalyst consisting substantially of from 30 to 100% of an active ingredient selected from the group consisting of titanium dioxide, zirconium dioxide, hafnium dioxide, and mixtures thereof, and from 0 to 70% of a support selected from the group consisting of alumina and magnesia, the process being carried out at a temperature of from 400 to about 560° C. In preferred embodiments, the process is conducted at a pressure of from about 0.1 to about 50 atmospheres, and at a space velocity of from 0.2 to 6 liquid volumes of paraffin feed per hour per volume of catalyst.

The active ingredients in the catalysts of this invention are titanium dioxide, zirconium dioxide, and hafnium dioxide. Any particular catalyst may contain one or more of said metal dioxides. Moreover, the catalysts may contain a support such as alumina and magnesia. In general, the active ingredients are employed in the amounts of from 30 to 100% whereas the supports are employed in the amounts of from zero to 70%.

Alumina and magnesia may be prepared by any known methods in the art. These ingredients usually have a surface area in the range of from 5 to about 200 square meters per gram. The catalyst may be used in a fixed, moving, or fluidized bed.

The catalysts of this invention may be prepared in any manner available in the art. One method of preparing the catalysts is, for example, merely blending the active ingredients with the inert ingredients, if such are employed. Another method of preparation which may be employed comprises suspending, for example, hydrated titanium dioxide powder in ammonium hydroxide and adding thereto aluminum nitrate. The resulting mixture is filtered and the solid obtained is calcined at a temperature of from 500 to 900° C. The same method may be employed in preparing analogous zirconium and hafnium compounds.

Co-precipitation may also be employed in preparing the catalysts of this invention. In this method any compound of titanium, zirconium, or hafnium, which will form hydrated titanium, zirconium, or hafnium oxides when contacted with aqueous alkaline solution, may be used. Such compounds may be, for example, tetrachlorides, nitrates, oxychlorides, acetates, alkoxides, and other similar compounds. Such compounds are added to an aluminum hydroxide suspension in ammonium hydroxide. As previously described, the resulting mixture is filtered and the solid dried and calcined.

In practicing the present invention, the process is carried out at a temperature of from 400 to 560° C., preferably from 425 to 525° C., and most preferably from 450 to 510° C.

The pressure at which the present invention is usually carried out is from 0.1 to about 50 atmospheres, but preferably, it is from 0.5 to 10 atmospheres, and most preferably, from 0.5 to 2.0 atmospheres. However, higher or lower pressures may be employed.

With respect to the space velocity at which contact between the hydrocarbon feed and the catalyst may be carried out, it may range from 0.2 to about 10 liquid volumes of feed per hour per volume of catalyst. Preferably, space velocity should be from 0.5 to 6.0 volumes of feed per hour per volume of catalyst. However, higher or lower space velocities may be employed.

The hydrocarbons employed in this process as a feed material are n-paraffins having from 6 to about 24 carbon atoms such as n-hexane, n-heptane, n-decane, n-dodecane, n-hexadecane, n-octadecane, n-eicosane, and n-tetraeicosane. The preferred paraffins are those having from 10 to 18 carbon atoms.

The unexpected result of the catalysts of this invention is that, in addition to producing monoolefins in relatively good yields, only a very small amount of aromatization occurs. The process of this invention, therefore, is economical since such small amounts of aromatic products may generally be tolerated for commercial purposes and, thus, the need for expensive and tedious separation steps is eliminated.

In practicing this invention, inert gaseous diluents such as nitrogen, carbon dioxide, or steam may be advantageously employed. The ratio in moles of a diluent to the paraffin feed is usually in the range of from 1:1 to 5:1.

The following examples further serve to illustrate the process of this invention but do not limit it. All parts and percentages are by weight unless otherwise noted.

*Example 1*

A feed consisting essentially of n-dodecane was brought into contact with a catalyst containing 86 weight percent of titanium dioxide and 14 weight percent of alumina. The contact between the dodecane and the catalyst was at a space velocity of 1.5 liquid volume per hour per volume of catalyst and at a temperature of 500° C., with the pressure being approximately atmospheric. The resulting dehydrogenation products represented a $C_{12}$-olefin yield of about 58 percent based on the paraffin conversion of 16.7 percent. The aromatic yield was about 15 percent and the cracking products resulted in about a 27 percent yield.

A similar olefin yield is obtained when the catalyst containing 85 percent hafnium dioxide and 15 percent magnesia is employed in the above example.

*Example 2*

Example 1 was repeated exactly as described above except that the space velocity was changed to 0.8 liquid volume per hour per volume of catalyst. This resulted in a 47% yield of $C_{12}$-olefin based on the paraffin conversion of 25 percent. The aromatic yield was 24 percent and the cracking products resulted in about a 29 percent yield.

*Example 3*

The feed, catalyst, temperature, and pressure were the same as in Example 1. The space velocity, however, was increased to 2 liquid volumes of feed per hour per volume of catalyst. The dehydrogenation products and yields obtained were: $C_{12}$-olefin, 62%; aromatics, 12%; cracking products, 26%. The yields are based on the paraffin conversion of 12.5%.

A slightly lower olefin yield is obtained when, in the above example, the catalyst having 70% titanium dioxide and 30% alumina is employed.

*Example 4*

A feed consisting essentially of n-dodecane was brought into contact with a catalyst containing 84 weight percent of titanium dioxide and 16 weight percent of alumina. The contact between the dodecane and the catalyst was at a space velocity of 1.0 liquid volume per hour per volume of catalyst and at a temperature of 499° C. with the pressure being approximately atmospheric. The resulting dehydrogenation product represented a 63% yield of $C_{12}$-olefin based on the paraffin conversion of 13.7%. The aromatic yield was about 7% and the cracking product resulted in about 30% yield.

*Example 5*

An n-dodecane feed was brought into contact with a catalyst containing 98% zirconium dioxide and 2% alumina. The contact between the feed and the catalyst was at a space velocity of 2.0 liquid volume dodecane per hour per volume of catalyst at a temperature of 500° C. and with the pressure being approximately atmospheric. The resulting dehydrogenation products represented a $C_{12}$-olefin yield of 57% based on the paraffin conversion of 8.5%. The aromatic yield was 12% and cracking products 31%.

A similar result is obtained when 100% titanium dioxide is employed as a catalyst and the hydrocarbon feed is n-decane.

*Example 6*

A hydrocarbon feed consisting substantially of n-dodecane was brought into contact with a catalyst containing 86% titanium dioxide and 14% alumina. The contact between the feed and the catalyst was at a space velocity of 0.8 liquid volume of feed per hour per volume of catalyst and at a temperature of 458° C. at a pressure being approximately atmospheric. The yield of $C_{12}$-olefin based on 8% paraffin conversion was 85%, the yield of cracking products was 15%, and the yield of aromatics was 0%.

Analogous results are obtained when the hydrocarbon feed is composed of n-dodecane, n-tridecane, n-tetradecane, and n-pentadecane.

Similar results are obtained when, in the above example, the hydrocarbon feed is n-octadecane and the process is carried out at a pressure of 0.5 atmosphere.

*Example 7*

The feed, catalyst, and pressure were the same as in Example 6. The temperature was 489° C., and the space velocity was 2.0 liquid volume of feed per hour per volume of catalyst. The dehydrogenation products represented at $C_{12}$-olefin yield of 69%, aromatics 0%, and cracking products, 31%. The yields are based on the paraffin conversion of 9.6%.

Substantially the same results are obtained when the catalyst having the composition of 10% titanium dioxide, 10% zirconium dioxide, and 80% magnesia is employed in the above example.

*Example 8*

The feed, catalyst, and pressure were the same as in Example 4. The temperature was 499° C. and the space velocity was 1.5 liquid volume of feed per hour per volume of catalyst. The yield of $C_{12}$-olefin was 79% based on 11.1% conversion of paraffins, and the yield of aromatics and cracking products were 0% and 21% respectively.

Similar results are obtained when, in the above example, the feed is n-hexadecane, and the catalyst is composed of 86% titanium dioxide, 8% alumina, 6% magnesia, and the pressure is 2.0 atmospheres.

The products produced by the process of this invention are mixtures of monoolefin isomers having the same number of carbon atoms as the paraffin starting material. Thus, when n-dodecane is used as the paraffin feed, the product obtained would be a mixture of dodecane isomers.

The olefins produced by the process of this invention are well known compounds and have the many utilities which are known for them. For example, they are valuable chemical intermediates and can be transformed into acids by an ozonolysis reaction. Thus, for example, tetradecene-2 can be reacted with ozone to yield lauric acid, a detergent range acid. Similarly, the other olefins produced by this process can be ozonized to yield the corresponding acids. When ozonizing the products of the process of this invention, the reaction is generally carried out at a low temperature; e.g., from −50 to about 10° C. After the ozonation reaction is completed, the resultant reaction mixture is usually treated with another oxidant such as air or oxygen to obtain the product acid. The secondary oxidation is usually carried out at a temperature within the range of 20 to 90° C. Solvents which can be employed in the ozonolysis of olefins include inert solvents such as chloroform and carbon tetrachloride or hydroxylic solvents such as methanol and acetic acid.

Having fully described the novel catalysts, their mode of preparation, and the novel function thereof, as well as the process employing these catalysts, it is desired that this invention be limited only within the lawful scope of the appended claims.

I claim:

1. A process for the dehydrogenation of an n-paraffin having from 6 to 24 carbon atoms to the corresponding olefin, said process comprising contacting a feed containing at least one n-paraffin with a catalyst consisting substantially of from 30 to 100% of an active ingredient selected from the group consisting of titanium dioxide, zirconium dioxide, hafnium dioxide, and mixtures thereof, and from 0 to 70% of a catalytic support selected from the group consisting of alumina and magnesia, said process being carried out at a temperature of from 400 to about 560° C.

2. The process of claim 1 wherein said catalyst consists substantially of from 30 to 100% of titanium dioxide as the active ingredient and from 0 to 70% of alumina as the support, and the process is carried out at a pressure of from 0.1 to 50 atmospheres and at a space velocity of from 0.2 to 6 liquid volumes of paraffin feed per hour per volume of catalyst.

3. The process of claim 2 wherein said catalyst consists substantially of 86% of titanium dioxide as the active ingredient, and 14% of alumina as the support, and the process is carried out at a temperature of from 450 to 510° C., at an atmospheric pressure and at a space velocity of from 0.5 to 3 liquid volumes of paraffin feed per hour per volume of catalyst.

4. The process of claim 3 wherein said n-paraffin is selected from those having from 10 to 18 carbon atoms.

5. The process of claim 3 wherein said support is magnesia.

6. The process of claim 1 wherein said catalyst consists substantially of from 30 to 100% of zirconium dioxide as the active ingredient and from 0 to 30% of alumina as the support, and the process is carried out at a pressure of from 0.1 to 50 atmospheres and at a space velocity of 0.2 to 6 liquid volumes of paraffin feed per hour per volume of catalyst.

7. The process of claim 6 wherein the catalyst consists substantially of 98% of zirconium dioxide as the active ingredient and 2% of alumina as the support, and the process is carried out at a temperature of from 450 to 510° C., at an atmospheric pressure and at a space velocity of 0.5 to 3 liquid volumes of paraffin feed per hour per volume of catalyst.

8. The process of claim 7 wherein said n-paraffin is selected from those having from 10 to 18 carbon atoms.

9. The process of claim 7 wherein said support is magnesia.

References Cited by the Examiner

UNITED STATES PATENTS 2,719,171  9/1955  Kolb _____ 260—669 X
2,958,717  11/1960  Karkalits et al. _____ 260—680

DELBERT E. GANTZ, *Primary Examiner.*

G. E. SCHMITKONS, *Assistant Examiner.*